Figure 2:
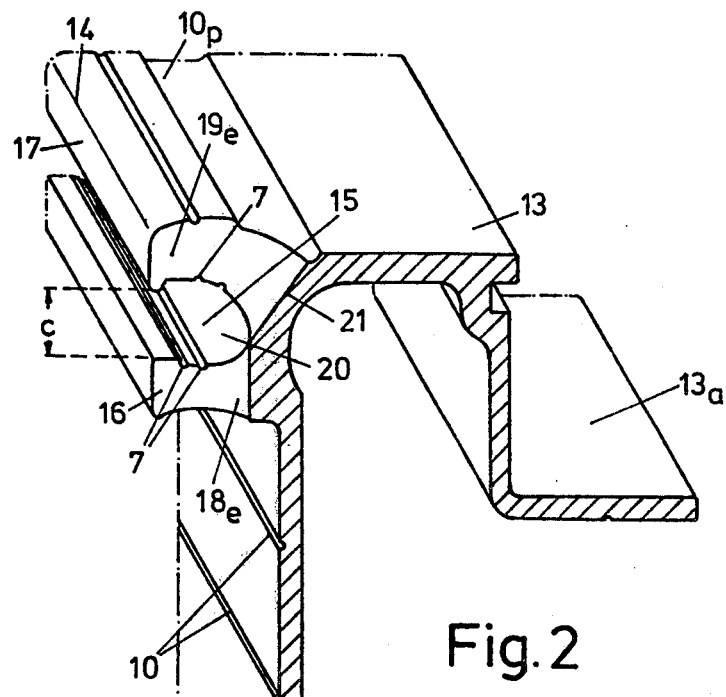

United States Patent [19]

Hrasche

[11] 4,167,273

[45] Sep. 11, 1979

[54] LOAD CARRYING PLATFORM OR BACK FOR VEHICLES

[75] Inventor: Heinrich Hrasche, Dietikon, Switzerland

[73] Assignee: Swiss Aluminium Ltd., Chippis, Switzerland

[21] Appl. No.: 850,155

[22] Filed: Nov. 10, 1977

[30] Foreign Application Priority Data

Dec. 8, 1976 [CH] Switzerland ................... 15459/76

[51] Int. Cl.² ............................................. B60P 7/00
[52] U.S. Cl. ............................ 280/179 R; 105/368 T
[58] Field of Search ................ 280/179 R, 179 A; 105/368 T; 296/35, 40; 248/500, 505

[56] References Cited

U.S. PATENT DOCUMENTS

| 2,688,289 | 9/1954 | Sterling | 280/179 R |
| 3,478,995 | 11/1969 | Lautzenhiser | 105/368 T |
| 3,904,154 | 9/1975 | Jones | 280/179 R |
| 3,917,338 | 11/1975 | Becker | 280/179 A |

*Primary Examiner*—Philip Goodman
*Attorney, Agent, or Firm*—Robert H. Bachman

[57] ABSTRACT

A back or load carrying platform of a vehicle is made out of a frame and elements made of light metal and has at least one holding device to which ropes or other load securing facilities can be attached to hold the load in position during transportation. This holding device is ring-shaped and is hinged in a recess in the frame around the platform from which, when required, it can be removed.

31 Claims, 10 Drawing Figures

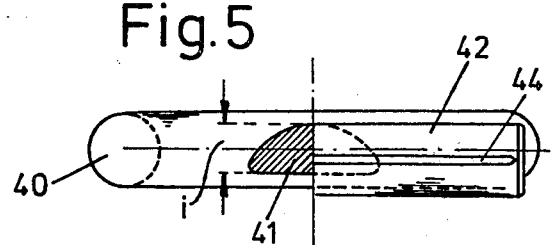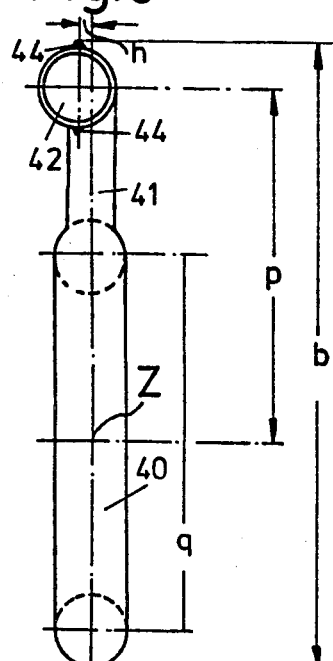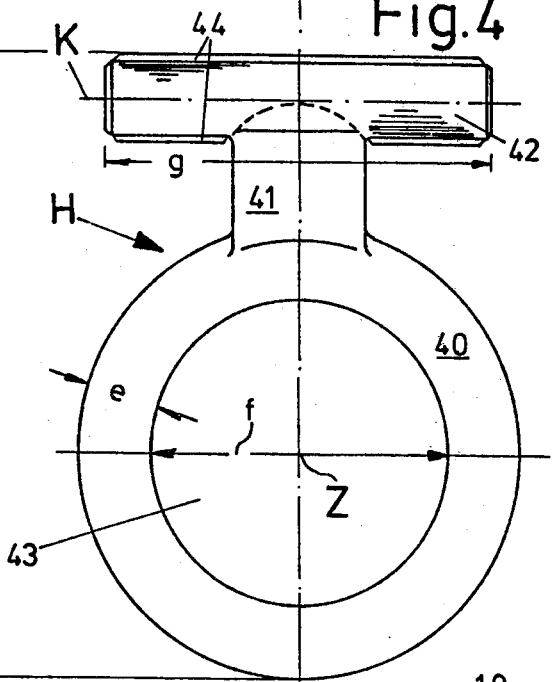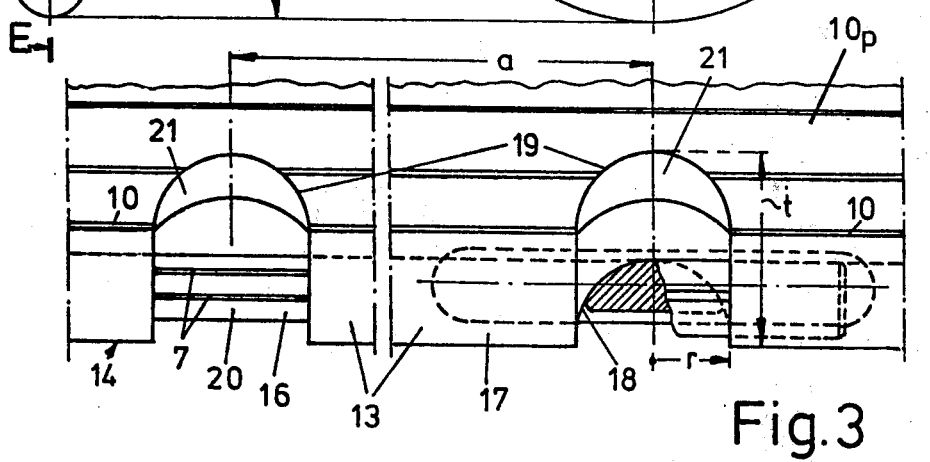

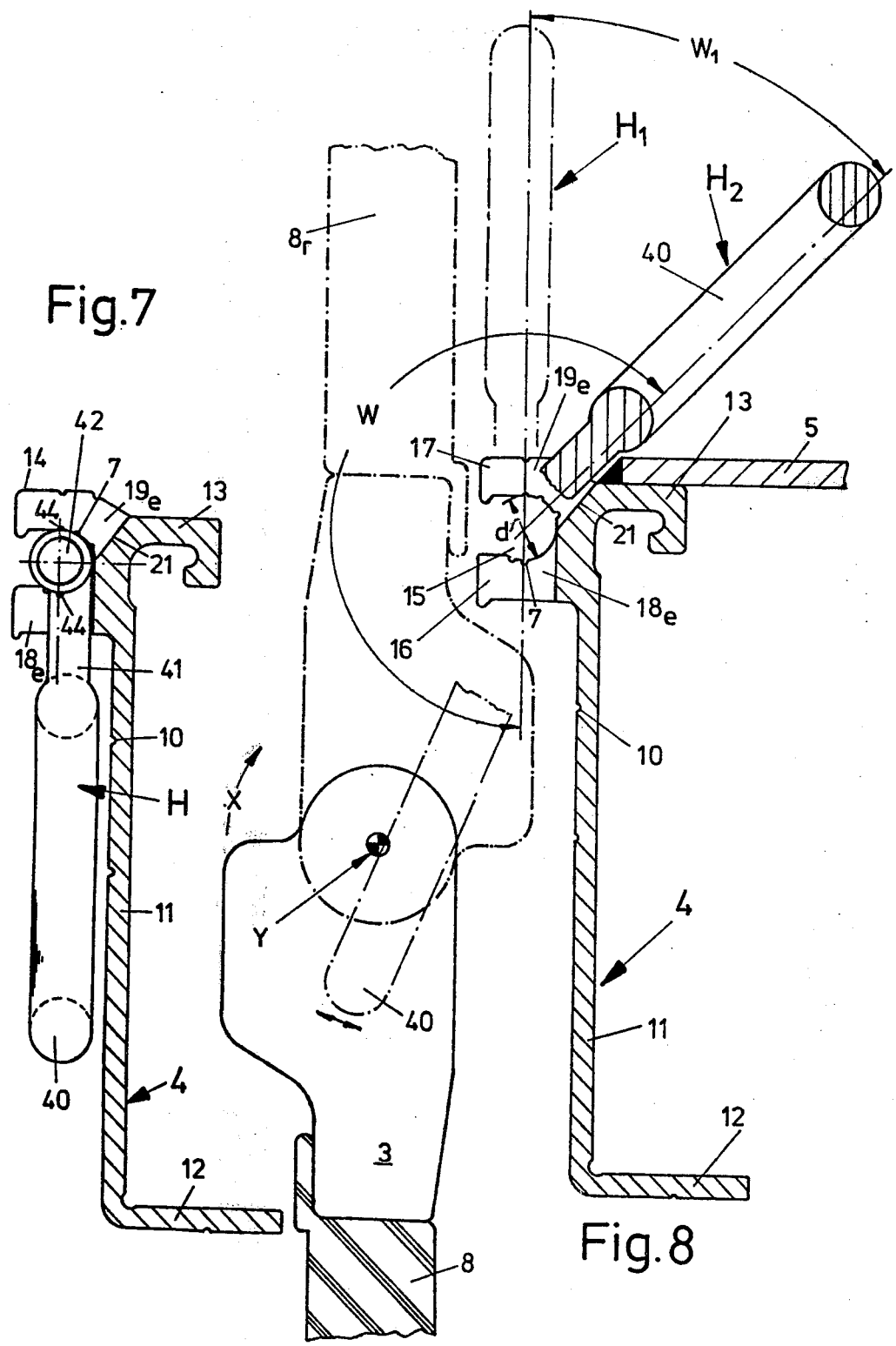

LOAD CARRYING PLATFORM OR BACK FOR VEHICLES

The invention concerns a load carrying platform or back for a vehicle in particular such platforms made out of light metal elements mounted in a frame and for vehicles with at least one ring-shaped holding device which is hinged to the load carrying platform and is for attaching ropes or the like clamping facilities for securing loads and holding them in place.

In the draft of the document "Securing loads on road transport vehicles" concerning VDI guidelines 2700 (VDI Publishers Ltd, Dusseldorf, June 1973, pages 34 and 35) special load carrying platforms are described where loads are held by means of ropes, belts or chains fixed to rings or lugs; the loads on vehicles must be arranged in such a manner and in keeping with the regulations that the loads can not slide about during transportation.

The connection between the load carrying platform and the ring-shaped holding device can e.g. as described in the special issue from the journal "Illustrierte Zeitung Arbeitsschutz" (OTT, Publishers, Thun, No. 1-6/1976, 1/1976; page 26) be made by means of sockets in the platform in which hinged handle-like rings are provided.

All known holding and securing devices for use with load carrying platforms exhibit considerable disadvantages; they are made up of a plurality of parts and are therefore relatively expensive to make and install, and they require a relatively large area which makes their installation expensive, particularly when costly recesses have to be made in the platform. Safety during the loading of such platforms is particularly at risk since moving loads on or from the platform with hand operated loading platforms or fork-lift trucks frequently results in damage.

With this in mind the inventor set himself the task of designing a load carrying platform or vehicle back of the kind described at the beginning in such a way that the known difficulties are avoided and that above all a safe means of engaging load-securing facilities is provided and is both convenient for handling, and is technically sound from the point of view of use in traffic. Furthermore, noise due to rattling—such as can be caused by holding devices which are hinged or not in use—should be avoided.

The solution to this problem is made possible by way of the invention in which a load carrying platform is provided with a groove-shaped recess the opening into which is narrower than its diameter and in which the bearing of the holding device fits, and if desired can be removed from, and can be hinged around an axis which is approximately that of the longitudinal axis of the groove. The said groove-shaped recess in the frame of the platform should be provided with at least one recess which runs transverse to the long axis of the groove and in which the holding device can be pivoted to a limited degree.

The undercut hinging groove which runs at least along the long sides of the load carrying platform in no way represents an obstacle or difficulty; this is also true of the holding device which is held in the said groove and which in accordance with other features of the invention is in one piece and comprising a ring- or arc-shaped piece and at least one transverse rod projecting out of the ring- or arc-shaped part with a bolt provided at the free end to serve as the bearings on which the holding device hinges. It has been found particularly advantageous to provide two transverse rods on the arc-shaped piece to make an approximately U-shaped part with a bolt projecting out of each end; both bolts should—as necessary pointing away from each other—lie on the same axis. Holding devices of such a design exhibit considerable advantages over the normal devices for this purpose, can be manufactured inexpensively and can be easily mounted. Furthermore, they can be removed from the platform at any time which, depending on the load in question, is often desired.

The axis of the bolt can, in accordance with the invention, run approximately parallel to a diameter of the opening in the ring- or arc-shaped piece; this way the ring of the holding device becomes oriented in a direction approximately parallel to the load carrying platform.

Additionally the central axis of the bolt or bolts is/are arranged to be outside the plane generated by the diameters of the opening in the ring- or arc-shaped piece i.e. that central axis does not intercept the long axis of the transverse rod which connects the ring to the bolt. The size of this sideways displacement is less than the thickness or the material diameter of the ring; that plane is, when the holding device is not in use, nearer to the frame of the platform than the central axis of the bolt. This allows the ring- or U-shaped piece to lie as close as possible to the frame when not in use and also to have as large a range of movement as possible.

It is within the scope of the invention that each transverse rod of the holding device has a reduced cross section in the form for example of a semi-circle, whose crown thickness is smaller than the axial opening or entrance to the hinging groove; thus the holding device can be pushed into the hinging groove but only at a particular angle to the platform or frame. This also allows the bolt to be fitted into the groove, that is it allows the holding device to be removed again from the platform It should be possible, in accordance with the invention, to be able to adjust the various positions of the holding device and its inclination to the frame or platform by means of stops projecting out of the bolt or bolts into the inner wall of the hinging groove in which the bolt or bolts rest. For this there should be at least one comb-like rib projecting out of the circumference of the bolt and running approximately parallel to its central axis—preferably however the bolt should be provided with two diametrically opposite such ribs. These engage, in accordance with the invention, in small longitudinal grooves or similar suitable stops provided in the inner wall of the hinging groove in the frame supporting the holding device.

Usefully two small longitudinal grooves or the like, side by side and on opposite sides of the axis of the hinging groove, are provided and mate with correspondingly placed, diametrically facing ribs on the bolt or bolts thus forming together a stop facility; at least two such pairs of mating stop facilities result in a vertical position and an inclined, operating position in which the holding device can be placed.

Likewise a further measure favours securing the holding device in various operating positions and also providing a good fit between these projections viz., the diameter of the hinging groove should be smaller than the maximum thickness of the bolt, which therefore is always under pressure and is not as readily moved out of position than otherwise would be the case.

According to another feature of the invention the hinging groove is formed between two ribs, at least one of which is provided with a recess. The recess as viewed in a plan view should be tongue-shaped, and should be in the upper rib of the platform when it is assembled.

It has been found favourable to provide in line with each recess in the upper rib also a recess in the lower rib in order to increase the range through which the holding device may be tilted. The lower recess, as seen in a plan view, can be approximately semi-circular in form and not as deep as the upper, tongue-shaped recess; between both recesses there is provided an inclined face hich serves as a stop for the holding device.

So that the holding device of the invention does not become an obstacle for the side-walls, which are normally mounted at the edge of the load carrying platform the total length of the holding device of the invention should be less than the shortest distance of the side-wall from the upper edge of the frame when the side wall is not being used and allows access to the load carrying platform.

It has been found particularly favourable to have the side-wall, when in its operating position around the load carrying platform, adjacent to the hinging groove or ribs which form this groove, so that the raised side-wall additionally ensures that the holding device is kept in the hinging groove.

The frame around the load carrying platform comprises usefully an approximately U-shaped—preferably light metal—section, the central strut of which is long compared with its flanges, and the two ribs forming the undercut hinging groove project from the upper edge of the said strut when the frame is in the assembled position. The upper rib should project out at a higher level than the flange which accommodates the light elements forming the load bearing part of the platform so that these elements and the upper surface of the upper rib are approximately in line with each other. In order to make this possible also with thicker light metal elements, a supporting ledge, which could be L-shaped for example, can be provided on the upper flange of the section.

Further advantages, features and details of the invention are revealed in the following description of preferred embodiments and with the aid of the drawings viz., FIG. 1: A perspective view of part of a vehicle.

FIG. 2: A perspective view of the section along II—II in FIG. 1.

FIG. 3: An enlarged plan view of a detail from FIG. 1.

FIG. 4: A section through a holding device provided on the vehicle and shown here in approximately its actual size.

FIG. 5: A plan view of the holding device shown in FIG. 4.

FIG. 6: An end view of the holding device shown in FIG. 4.

FIG. 7: A section approximately along the line II—II in FIG. 1 but of another version of the vehicle and with the holding device in the position when not in operation.

FIG. 8: One of the operative positions of the holding device shown in FIG. 7.

Figure 9:
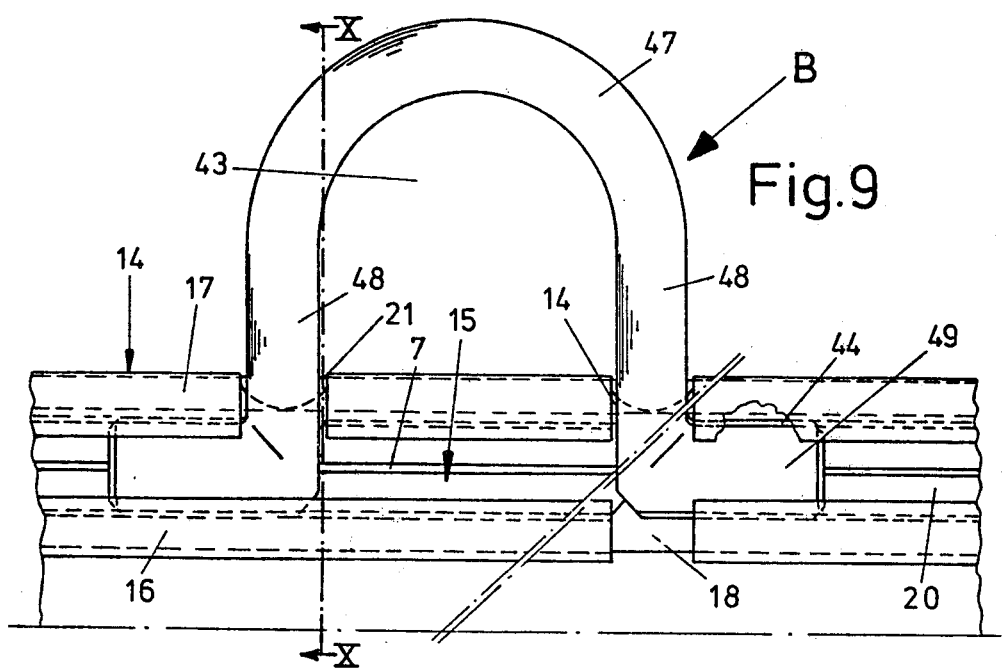

FIG. 9: A section through another holding device on a part of the vehicle, showing the device in approximately its actual size.

Figure 10:
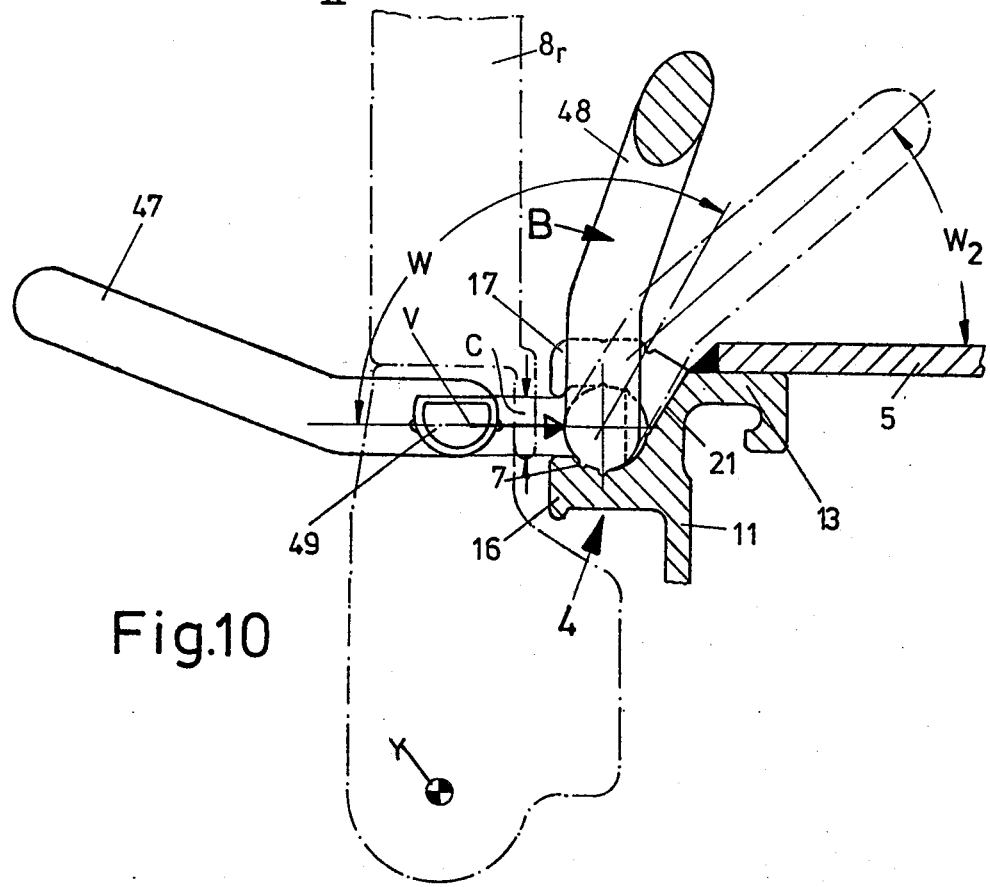

FIG. 10: A section through FIG. 9 along the line X—X.

Figure 1:
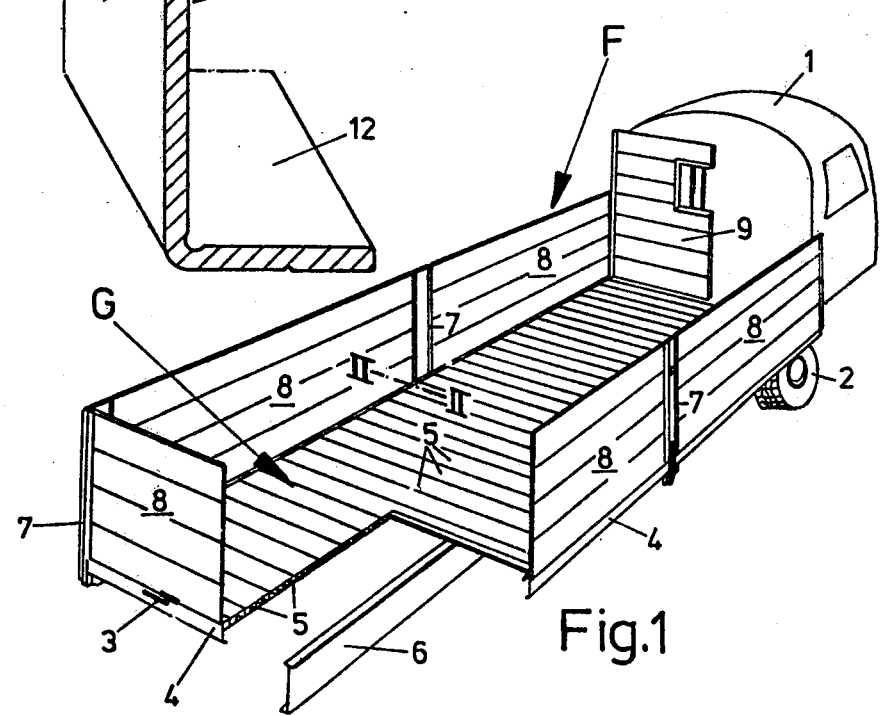

The load carrying platform or back G of a lorry F shown in FIG. 1 with driving cabin 1 and tyres 2 comprises floor sections 5 surrounded by a frame 4 and resting on longitudinal beams 6. Projecting out from the frame 4 are posts 7 between which there are side-walls 8 which pivot on hinges 3, and a fixed end wall 9.

The aluminum extrusion U which has grooves 10 and forms the frame 4 around the back G comprises a strut 11 with a flange 12, which is at the lower end of the frame 4 when built into the lorry F, and also an upper flange 13 which accommodates the floor sections 5. As shown in FIG. 2 a groove $10_p$ which ends in an L-shaped support ledge $13_a$ is provided in this flange 13.

An undercut hinging groove 15, which is semi-circular in cross section with diameter d equal to a value of 13 cm for example, runs along the edge 14 formed by the strut 11 and the upper flange 13. This groove 15 is delimited by two tongue-shaped ribs 16,17 projecting out from the strut 11 forming an opening of distance c equal to about 10 mm in front of the groove 15. On the inside face 20 of the hinging groove 15 there are provided smaller longitudinal grooves 7 which are approximately semi-circular in cross section. The lower rib 16, as shown in FIG. 3 (right), is interrupted at arbitrary spacings a by semi-circular recesses the radius r of which is smaller than half of the depth t of the overlying tongue-shaped recesses 19 of the upper rib 17. The walls of the recesses 18 and 19 are denoted by $18_e$ and $19_e$ respectively. The left hand side of FIG. 3 shows a special exemplified embodiment of the lorry back 4, in which at the groove 15 only the upper recess is provided and in which the longitudinal grooves 7 are visible.

In the region of each upper recess 19, or of each pair of overlying recesses 18,19 there is provided a holding device H of total length b equal to about 100 mm for securing belts, cables or chains (not shown here).

As shown in FIG. 4 a short rod 41 of cross section which is similar to a semi-circle projects out from a ring 40 made from round rod of diameter e equal to approximately 12 mm. The short rod 41 connects that ring 40 in a rigid manner to a bolt 42 which juts out on both sides of the rod 41 and runs parallel to the main diameter f of the opening 43 surrounded by the ring 40. The diameters of hole 43, ring 40 and short projecting rod 41 lie on a plane E (FIG. 6) to which the central axis K of the bolt 42 is displaced sideways by a distance h of 2 mm. The length g of the bolt 42 corresponds approximately to that of the diameter q described by the central axis of the ring 40 which is for example 62 mm and thus also corresponds approximately to the distance p between the centre of the rod 42 and the centre Z of the hole 43.

Since the thickness i (FIG. 5) of the connecting rod 41 is smaller than the opening c to the groove 15 in the frame 4, the bolt 42 of the holding device H can be slid in to that groove 15 without effort at the recesses 18,19 and rotated by a limited amount in the hinging groove 15 when the rod 41 remains in the region of the recesses 18,19.

When in the resting position, as shown in FIG. 7, the holding device H hangs down approximately parallel to the central strut 11 of the frame 4 through the lower recess 18. The ring 40 can be raised upwards from this resting position, hinging about the middle axis K of the bolt 42—for example about 180° into the position H, shown by broken lines in FIG. 8—and tilted a further angle $w_1$ of approximately 45° towards the flooring sections 5 or to an inclined arresting surface 21 in the upper recess 19 (position $H_2$); this stop surface 21 and the central strut 11 of the frame 4 determine the size of angle w through which the holding device H can be moved. The holding device H can be fixed within this range w, not only in its position at rest but also in its operating positions $H_1$, $H_2$: two longitudinal projections 44 which are positioned diametrically opposite each other on the bolt 42 and parallel to its central axis K, engage in the longitudinal grooves 7 provided for this purpose on the face 20 inside the groove 15. In order to provide a friction fit between bolt 42 and face 20 and therefore a proper seating for the holding device H so that it does not rattle in the groove 15, the diameter s of the bolt 42 can be marginally larger than or the same as the diameter d of the groove 15. If a lower recess 18 is provided, when the holding device is in the resting position, the rod 41 fits into that recess 18 and, in the operating positions $H_1$ and $H_2$, is held at the side by the wall $19_e$ of the upper recess 19 in such a way that the bolt 42 always remains securely in the axial position. Before using the holding device H, the sidewall 8 is moved downwards about a hinging point y and thus out of the range of movement w of the ring 40. This is secured against unauthorized removal in its resting position by means of the side-wall 8, which is swung upwards in the direction x. Of course the holding device h can be taken out of the groove 15 when not in use.

Another holding device B comprises a piece 47 which is shaped like part of a ring, having at the ends of the U-shaped bar 48 coaxial bolts 49 pointing away from each other. These fit into the groove 15 of the frame 4, their longitudinal ribs 44 resting in the corresponding grooves 7 inside the groove 20 in the manner previously described. The bolts 49 have a "squashed" cross section which allows the bolts 49 to be brought into the groove 15 in the horizontal position shown in FIG. 10 by pushing in direction v. The range of movement w from this position is about 115°, which corresponds to an angle of inclination $w_2$ of about 40° to the flooring sections.

The holding device B is bent to an angle $w_5$ at the transition from the curved part 47 to the shafts 48. The shafts 48 can be moved downwards from the horizontal position to the central strut 11 only when both the upper and the lower recesses, 19 and 18 respectively, are provided (right hand side of FIGS. 3,9). Otherwise the lower rib 16 of the frame 4 serves as a stop limiting the movement of the holding device B through the range w.

What is claimed is:

1. Load carrying platforms or backs of vehicles, in particular such platforms made out of light metal elements, including a platform surface and a platform frame therearound, with at least one ring-shaped holding device which is hinged to said frame and is for attaching ropes or the like clamping facilities for securing loads in place on said platform surface, in which said frame is provided with at least one groove-shaped recess which has a diameter and narrower opening, into which a bearing part of the hinged holding device, pivotable about the long axis of the recess, fits or from which it can be removed, said holding device being pivotable from an operative position adjacent said platform surface to a resting position adjacent said platform frame.

2. Load carrying platform according to claim 1 in which the groove-like recess in the frame of the platform is provided at the edge of the frame, and has at least one recess transverse to the long axis of the recess and in which the holding device can pivot in a limited manner.

3. Load carrying platform according to claim 1 in which the inside face of the groove is provided with longitudinal grooves or notches which serve as stops for the radial projections on the bolt or bolts.

4. Load carrying platform according to claim 1 in which the diameter of the recess is equal to or smaller than the diameter of the bolt or bolts.

5. Load carrying platform according to claim 1 in which there is provided at least one radial recess in the bearing part of the holding device.

6. Load carrying platform according to claim 1 in which a holding device comprises a ring and at least one transverse rod or the like projecting out from the ring and having at its free end the bearing part in the form of a bolt.

7. Load carrying platform according to claim 6 in which the rod projects out radially from the ring.

8. Load carrying platform according to claim 6 in which the length of the rod is approximately double the diameter of the material forming the ring.

9. Load carrying platform according to claim 6 in which the length of the bolt is equal to approximately the sum of the diameter of the opening inside the ring and twice the diameter of the material or approximately the average ring diameter.

10. Load carrying platform according to claim 6 in which the bolt runs approximately parallel to a diameter in the opening of the ring or in the curved part.

11. Load carrying platform according to claim 6 in which the plane of the diameters of the opening of the ring or part ring of the holding device when in the resting position is nearer the frame than the central axis of the bolt.

12. Load carrying platform according to claim 6 in which a holding device comprises an arc-shaped part and at least one transverse rod or the like projecting out from this part and having at the free end the bearing part in the form of a bolt or bolts.

13. Load carrying platform according to claim 12 in which two transverse rods projecting out from the curved part form a U-shaped handle with a bolt extending out from each of its free ends.

14. Load carrying platform according to claim 13 in which the bolts are coaxial and point away from each other.

15. Load carrying platform according to claim 5 in which at least one comb-like projection stands out from the outer face of the bearing part or bolt and runs approximately parallel to the central axis to enable adjustment of the holding device and its inclination to the frame.

16. Load carrying platform according to claim 1 in which the groove is formed between two ribs, of which at least one is provided with a recess on the inside face.

17. Load carrying platform according to claim 16 in which the recess is in the upper rib, when built into the platform, and is tongue-shaped in cross section.

18. Load carrying platform according to claim 16 in which a recess in the lower rib is approximately in line with a recess in the upper rib in order to increase the range through which the holding device may be tilted.

19. Load carrying platform according to claim 16 in which the recess in the lower rib is approximately semicircular in cross section.

20. Load carrying platform according to claim 16 in which the depth of the upper recess is equal to approximately twice the radius of the lower recess.

21. Load carrying platform according to claim 3 in which at least two pairs of grooves are provided for the holding device when in an operating, approximately vertical position and a position inclined to the load carrying surface.

22. Load carrying platforms or backs of vehicles, in particular such platforms made out of light metal elements in a platform frame and for vehicles with at least one ring-shaped holding device which is hinged to the load carrying platform and is for attaching ropes or the like clamping facilities for securing loads in place, in which the load carrying surface is provided with at least one groove-shaped recess which has a diameter and narrower opening, into which a bearing part of the hinged holding device, pivotable about the long axis of the recess, fits or from which it can be removed, said holding device comprising a ring and at least one transverse rod or the like projecting out from the ring and having at its free end the bearing part in the form of a bolt, with the central axis of the bolt or bolts being on a plane outside the plane described by the diameters of the opening or of the ring-shaped piece.

23. Load carrying platforms or backs of vehicles, in particular such platforms made out of light metal elements in a platform frame and for vehicles with at least one ring-shaped holding device which is hinged to the load carrying platform and is for attaching ropes or the like clamping facilities for securing loads in place, in which the load carrying surface is provided with at least one groove-shaped recess which has a diameter and narrower opening, into which a bearing part of the hinged holding device, pivotable about the long axis of the recess, fits or from which it can be removed, said holding device comprising a ring and at least one transverse rod or the like projecting out from the ring and having at its free end the bearing part in the form of a bolt, with the longitudinal axis of the bolt being displaced sideways with respect to the plane of the diameters of the opening by an amount which is smaller than the thickness or the diameter of the material of the ring.

24. Load carrying platforms or backs of vehicles, in particular such platforms made out of light metal elements in a platform frame and for vehicles with at least one ring-shaped holding device which is hinged to the load carrying platform and is for attaching ropes or the like clamping facilities for securing loads in place, in which the load carrying surface is provided with at least one groove-shaped recess which has a diameter and narrower opening, into which a bearing part of the hinged holding device, pivotable about the long axis of the recess, fits or from which it can be removed, including at least one hinged side-wall in which the total length of the holding device is smaller than the shortest distance of the side-wall from the upper edge of the frame, when the side-wall is not being used and therefore allows free access to the load carrying platform.

25. Load carrying platform with hinged side-wall according to claim 24 in which the total length of the holding device is smaller than the shortest distance of the side-wall from the upper edge of the frame, when the side-wall is not being used and therefore allows free access to the load carrying platform.

26. Load carrying platforms or backs of vehicles, in particular such platforms made out of light metal elements in a platform frame and for vehicles with at least one ring-shaped holding device which is hinged to the load carrying platform and is for attaching ropes or the like clamping facilities for securing loads in place, in which the load carrying surface is provided with at least one groove-shaped recess which has a diameter and narrower opening, into which a bearing part of the hinged holding device, pivotable about the long axis of the recess, fits or from which it can be removed, wherein the frame comprises at least on the long side of the vehicle an approximately U-shaped section made of light weight metal and having a middle strut which is long compared with the section flanges and from which section, in the region of its upper edge when in the assembled position, two undercut ribs project out to form a groove-shaped recess.

27. Load carrying platform according to claim 26 in which the upper rib projects upwards from the flange of the light metal section which accommodates the light metal elements.

28. Load carrying platform according to claim 26 in which a supporting flange, which is for example L-shaped in form, is provided on the flange which accommodates the light metal elements.

29. Load carrying platforms or backs of vehicles, in particular such platforms made out of light metal elements in a platform frame and for vehicles with at least one ring-shaped holding device which is hinged to the load carrying platform and is for attaching ropes or the like clamping facilities for securing loads in place, in which the load carrying surface is provided with at least one groove-shaped recess which has a diameter and narrower opening, into which a bearing part of the hinged holding device, pivotable about the long axis of the recess, fits or from which it can be removed, said holding device comprising a ring and at least one transverse rod or the like projecting out from the ring and having at its free end the bearing part in the form of a bolt, with the rod and/or the bolt of the holding device being provided with a shaped cross section, the thickness of which is smaller than the width of opening to the groove-shaped recess to permit the holding device to be fitted into said groove-shaped recess only at a particular angle to the platform.

30. Load carrying platforms or backs of vehicles, in particular such platforms made out of light metal elements in a platform frame and for vehicles with at least one ring-shaped holding device which is hinged to the load carrying platform and is for attaching ropes or the like clamping facilities for securing loads in place, in which the load carrying surface is provided with at least one groove-shaped recess which has a diameter and narrower opening, into which a bearing part of the hinged holding device, pivotable about the long axis of the recess, fits or from which it can be removed, said holding device comprising a ring and at least one transverse rod or the like projecting out from the ring and having at its free end the bearing part in the form of a bolt, wherein there are provided two diametrically opposite projections on the outer face of the bolt which engage longitudinal grooves or stops provided in the inner wall of the groove-shaped recess to enable adjustment of the holding device and its inclination to the frame.

31. Load carrying platform according to claim 30 in which there are provided two longitudinal grooves or such notches on each side of the axis of the groove serving as pairs of stops to accommodate the longitudinal projections in the bolt or bolts.

* * * * *